May 18, 1943      H. NERWIN      2,319,341
PHOTOGRAPHIC CAMERA
Filed Sept. 30, 1940
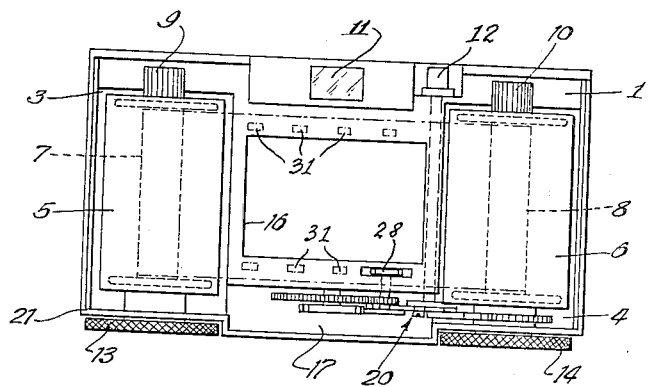
Inventor:
Hubert Nerwin
By:
Singer, Ehlert, Stern & Carlberg
Attys.

Patented May 18, 1943

2,319,341

UNITED STATES PATENT OFFICE 2,319,341

PHOTOGRAPHIC CAMERA

Hubert Nerwin, Dresden, Germany; vested in the Alien Property Custodian

Application September 30, 1940, Serial No. 359,003
In Germany August 1, 1939

3 Claims. (Cl. 95—31)

This invention relates to improvements in photographic cameras.

The invention particularly applies to rollfilm cameras using a film as employed in motion picture cameras, and as also used in so-called miniature cameras, or candid cameras.

An object of the invention is to provide a rollfilm camera of the aforementioned type which is distinguished by smallness of size and by low weight, as compared with other cameras utilizing the same type of film.

It is, furthermore, an object of the invention to provide a camera in which the principal parts are arranged in extremely compact and compendious form to facilitate carriage and handling of the camera.

The invention also has the object of simplifying in a camera of this character the film feed mechanism by positioning the mechanism regardless of the detail construction of the same close to the portion of the camera at which the direct engagement of a part of the film feed mechanism with the film takes place, whereby the necessity of providing transmitting elements of considerable length between the film feed mechanism proper and the film itself is dispensed with.

It is also an object of the invention to provide a camera of this character, in which the facility of locating an interlocking mechanism between the film feed mechanism and the shutter mechanism is greatly enhanced owing to the very location in which the film feed mechanism is placed.

With these and numerous other objects in view, an embodiment of the invention is illustrated in the accompanying drawing and is described in the following specification which makes reference to the drawing.

In the drawing:

Fig. 1 is a rear end elevation of a portion of the camera housing, the rear cover of said housing being removed, and Fig. 2 is a bottom plan view upon the complete camera housing.

With the object of generally reducing the volume of rollfilm cameras of this character, it has been proposed heretofore to locate a finder or distance meter within the camera between the two film rolls from one of which the film is taken off in order to be wound on the other roll. Heretofore it had been the practice to mount the finder or distance meter or exposure meter and similar accessories on top of the camera.

In the copending application, Ser. No. 323,472, a rollfilm camera of this type is disclosed, in which compactness is obtained by locating the finder within the camera housing, whereby the latter presents a flat top wall.

While in this manner the camera is rendered very compendious and presents a very neat appearance, still, certain difficulties are encountered when it is desired also to locate the film feed mechanism within the camera housing. In modern cameras, it is not only the desire to provide means for winding the film on the take-up spool, but also to safeguard against possible actuation of the film feed mechanism after the film has been advanced a length sufficient to make an exposure. It is also desired to provide safeguards against double exposures by releasing the film feed mechanism for actuation solely after the shutter had been tripped to make an exposure and to provide, on the other hand, an interlock between the shutter tensioning device and the film feed mechanism to prevent any actuation of the film feed mechanism after the shutter has been placed under tension.

In order to provide for a suitable arrangement of the film feed mechanism and still make it possible to combine with the film feed mechanism the safety devices referred to above in the present invention, the film feed mechanism is located in the interior of the camera between the two film spools.

In the embodiment illustrated, the camera casing generally indicated at 1 is provided with chambers 3 and 4 at its ends for receiving the film rolls. These rolls of film wound on the spool bodies or reels 7 and 8 may be enclosed in containers or cartridges 5 and 6 which are positioned in a generally known way within the end chambers. The reels 7 and 8 for the film rolls are usually equipped with a projecting pin or knob, as indicated at 9 and 10, and the film rolls are inserted into the chambers 3 and 4 with these projecting pins 9 and 10 at the upper end thereof. The actuation of these films for feeding is then usually carried out by rotation of a button or knob on the opposite end of the camera, one of these knobs being indicated, for instance, at 13, adjacent the bottom wall 21 of the casing 1.

The casing is, furthermore, provided in the space intermediate the chambers 3 and 4 with a cavity or compartment indicated at 17. This compartment may serve for receiving a film feed mechanism of any desired type, the detail construction of the film feed mechanism being of no interest for the present invention. Details of the film feed mechanism are shown in dotted lines exclusively with the reservation that the invention is not to be limited to any specific film feed mechanism but is solely directed to the relation or location of the film feed mechanism with respect to other parts of the camera casing.

While in most cameras the film feed mechanism is disposed within a chamber or space closely adjacent the finder, in the present application the finder 11 is shown to be on the top wall of the camera casing while the film feed mechanism 20 is within a cavity or compartment 17 which is at the bottom wall of the casing. The rotary knob or button 14 projecting from the bottom wall of the camera casing constitutes a manually operable actuating member for the film feed mechanism, and as shown, is located adjacent one end of the casing. A similar member projecting from the bottom wall 21 of the casing adjacent the opposite end may be provided, and the two projecting members 13, 14 are of equal height and present flat outer or under faces which are approximately flush with the lower face of the compartment 17. It will be recognized that under these conditions the combination of the projecting members 13, 14 and the bottom of the compartment 17 in their entirety form a flat surface facilitating any upright position of the camera when in use.

This lower wall of the compartment 17 also may be provided with a socket 18, preferably having a standard screw thread to facilitate the mounting of the casing on the threaded stud of a tripod, not shown.

This arrangement of the film feed mechanism adjacent the bottom portion of the camera casing also greatly facilitates the connection of this film feed mechanism with shutter actuating elements, and particularly with a shutter tensioning element. The shutter mechanism itself is not shown in detail and is of no importance for the present invention. While in most cameras, the shutter tensioning element in the form of a lever is arranged near the top of the casing, in the present invention the shutter tensioning lever 24 is mounted so as to be directed downwardly and to be movable in a path indicated at 25 adjacent the film feed mechanism. This will greatly facilitate the provision of interlocking assemblies between the film feed mechanism and the shutter tensioning element. Such interlocking mechanism in itself is well known in the art, whereby a feed of the film is prevented after the shutter tensioning element has been actuated, or an actuation of the shutter tensioning element is prevented before the film feed mechanism has been actuated. Owing to the closeness of the shutter tensioning element to the compartment 17 of the film feed mechanism 20, the connection between the mechanism and the tensioning element is greatly simplified, as contrasted with other cameras in use.

In most of the cameras, a shutter release element or trip lever is mounted to be movable adjacent the lower portion of the shutter. In the present invention, a shutter trip element 26 is shown as being movably located near the top portion of the shutter 30. This shutter release element now is adjacent the shutter trip 12 which ordinarily in cameras of this character is used for releasing the shutter at the time of the exposure. In most of the roll film cameras, the primary shutter trip element mounted on the casing itself similar to the shutter trip button 12 of the present invention is remote from the secondary shutter trip, while in the present application these two elements are located closely together and can therefore be selectively actuated by the operator.

Owing to the position of the film feed mechanism 20 adjacent the bottom portion of the casing, the engagement of an element forming part of said mechanism with the film itself is greatly facilitated, and the feed of the film simplified, as compared with those cameras in which the finder and the film feed mechanism are located both above the film.

Cameras of this character frequently utilize a film equipped with marginal rows of feeding perforations, as for instance, the film which is used in standard motion picture machines. A wall in the interior of the camera is provided with an opening 16 through which the light passing the lens, not shown, acts upon the film. In the present invention, the element 28 actuated by the film feed mechanism engages the marginal perforations 31 adjacent the lower edge only of said exposure opening 16, whereby, in accordance with the operation of the film feed mechanism 20, the film is advanced over the desired or predetermined length.

Of the two members 13, 14 projecting from the bottom wall of the casing, each in alinement with the pertaining roll films, one may be used as a manually operating member for winding up the film, and the other one may be utilized for rewinding the film on that roll from which it previously had been unwound. It is obvious, however, that owing to the closeness of the film feed mechanism to this pair of projecting members, and owing to the closeness of the film feed mechanism to the shutter tensioning element, one of these members, as for instance, the projecting member 13, may be connected with the shutter mechanism or with the film feed actuating mechanism to perform a function different from that of a rewinding knob. Thus, for instance, this member may be intermittently rotated, one step with each exposure, so as to constitute an exposure counter.

I claim:

1. In a photographic roll film camera, in combination, a casing having a top wall and a bottom wall, a chamber at each end adapted to receive each a standard film spool for perforated motion picture film, which spools have an axial extension at one end thereof which when the spools are inserted in their respective chamber is directed toward said top wall, a film supporting wall and extending between said two chambers in the focal plane of the camera, said wall being provided with a picture window and with an aperture below said picture window, a film feed mechanism including a manually operable member arranged on the bottom wall of said casing and a member actuated thereby which extends through said aperture for engaging the perforations of the film, and a finder in said camera casing below the top wall thereof and arranged above said picture window in the space between said film spool extensions.

2. In a photographic roll film camera, the combination of a casing having a top wall and a bottom wall and a chamber at each end adapted to receive each a standard film spool for perforated motion picture film, which spools have an axial extension at one end thereof, which extension when the spools are inserted in their respective chamber is directed toward said top wall, a film supporting wall extending between said two chambers in the focal plane of the camera and provided with a picture window and with another aperture below said window, a compartment between the lower edge of the picture window and the bottom wall of said casing, a film feed mechanism in said compartment and including a manually rotatable winding member on the outside of said bottom wall and a member rotated by the same and extending through said aperture for engaging the perforations of the film, and a finder in said camera casing below the top wall thereof and arranged above said picture window in the space between said film spool extensions.

3. In a photographic roll film camera, the combination of a casing having a top wall and a bottom wall and a chamber at each end adapted to receive each a standard film spool for perforated motion picture film, which spools have an axial extension at one end thereof, which extension when the spools are inserted in their respective chambers is directed toward said top wall, a film supporting wall extending between said two chambers in the focal plane of the camera and provided with a picture window and with another aperture below said window, a compartment between the lower edge of the picture window and the bottom wall of said casing, a film feed mechanism in said compartment and including a manually rotatable winding member arranged on the outside of said bottom wall in axial alinement with one of said film spools and a member rotated by the same and extending through said aperture for engaging the perforations of the films, a second manually rotatable member on said bottom wall in axial alinement with the other one of said film spools and adapted to be employed as film rewinding member, and a finder in said camera casing below the top wall thereof and arranged above said picture window in the space between said film spool extensions.

HUBERT NERWIN.